United States Patent

Parsons

[15] 3,658,353
[45] Apr. 25, 1972

[54] MASTER JAW STEPPING CHUCK
[72] Inventor: Hubert J. Parsons, Horseheads, N.Y.
[73] Assignee: Hardinge Brothers, Inc., Elmira, N.Y.
[22] Filed: Aug. 4, 1970
[21] Appl. No.: 60,862

[52] U.S. Cl. .......................................... 279/121, 279/74
[51] Int. Cl. ............................................. B23b 31/16
[58] Field of Search ............... 279/121, 114, 115, 116, 117, 279/118, 119, 120, 110, 1 F, 74

[56] References Cited

UNITED STATES PATENTS

| | | | |
|---|---|---|---|
| 3,515,400 | 6/1970 | Jendry | 279/121 |
| 3,494,627 | 2/1970 | Pirman | 279/121 |

*Primary Examiner*—Gil Weidenfeld
*Attorney*—Shlesinger, Arkwright & Garvey

[57] ABSTRACT

A master jaw chuck for machine tools including a guide plate attachable to a machine tool spindle, a key plate positioned rearwardly of the guide plate, master jaws positioned forwardly of the guide plate, spacer means between the key plate and the master jaws for spacing the key plate from the master jaws, fastener means passing through the spacer means for securing the key plate means to the master jaws and means operating against the master jaws for radially moving the master jaws, the spacer means, and the key plate.

16 Claims, 12 Drawing Figures

PATENTED APR 25 1972 3,658,353

INVENTOR.
HUBERT J. PARSONS

BY
Shlesinger, Arkwright & Garvey
ATTORNEYS

INVENTOR.
HUBERT J. PARSONS
BY
*Shlesinger, Arkwright & Garvey*
ATTORNEYS

INVENTOR.
HUBERT J. PARSONS

BY
Schlesinger, Arkwright & Garvey
ATTORNEYS

PATENTED APR 25 1972

INVENTOR.
HUBERT J. PARSONS

BY

Schlesinger, Arkwright & Garvey
ATTORNEYS

MASTER JAW STEPPING CHUCK

BACKGROUND AND OBJECTS

This invention relates to an improved stepping chuck, and more particularly, to a stepping chuck having master jaws to which are attached work gripping jaws for the particular type of work being used.

Prior art jaw chucks have been typified by a chuck body attachable to a machine tool spindle and including in the face plate of the body a plurality of radially extending slots, the slots being of T-shaped cross sectional configuration. Within the slots are adjustably positioned the chuck jaws, and they include a portion which conforms to the T-shaped slots. A cam plug is axially slidable within the central portion of the chuck body, and the cam surfaces of the plug engage complementary shaped cam surfaces on each of the jaws. Accordingly, by axial reciprocation of the plug, the jaws are urged radially in or out, depending upon the shape of the cam surfaces and the direction of movement of the plug. This type of configuration is generally shown in the U.S. Pat. to Bright No. 1,420,682 issued June 27, 1922.

Other improvements of this basic design are typified in the U.S. Pats. to Mott, No. 3,188,102, Highberg, No. 3,460,849 and Buck No. 3,252,710.

However, all of these prior art chucks have created problems in ease and cost of manufacture due to the problems associated with the T-slot design. That is to say that wear occurs rapidly within the slot and the jaws since the wear area of the jaws is quite small by comparison with the area of the slot. Thus, as the wear occurs on the surfaces of a jaw within a slot, the fit becomes loose, and the motion of the jaw in the slot becomes sloppy. Since the wear area of the jaw is rather small, the wear can occur rapidly, and accordingly the jaw must be replaced in order to maintain close tolerances.

When it becomes necessary to replace the jaws, an individual hand fitting operation is necessary. Each jaw has to be separately ground so that it will slide with no shake in its slot. Obviously, this increases the down time of the machine resulting in costly production delays.

Accordingly, a primary object of this invention is to overcome the wear disadvantages of prior art chuck constructions.

Another object of this invention is to produce a chuck with a greatly increased wear area resulting in reduced wear on the moving parts.

A further object of this invention is to provide an improved jaw chuck which eliminates the prior art T-slot construction in the chuck back plate.

Still another object of this invention is to provide a jaw chuck having parts which may readily be replaced to compensate for wear.

Yet, another object of this invention is to provide a jaw chuck having a master jaw to which are secured the work gripping jaws.

A still further object of this invention is to provide a jaw chuck having a 3 plate body construction as opposed to the 2 plate body construction of the prior art for the purpose of maintaining greater precision for longer time periods.

Another object of this invention is to provide an improved master jaw chuck utilizing a guide plate which serves to guide the radial movement of a key plate and the master jaws.

Yet, a further object of this invention is to provide a master jaw chuck having spacer members which may be readily replaced or re-ground to compensate for wear in the chuck body.

These and other objects and advantages of this invention will become apparent when considered in light of the following description and claims when taken together with the accompanying drawings in which:

DESCRIPTION OF THE INVENTION

Figure 1:
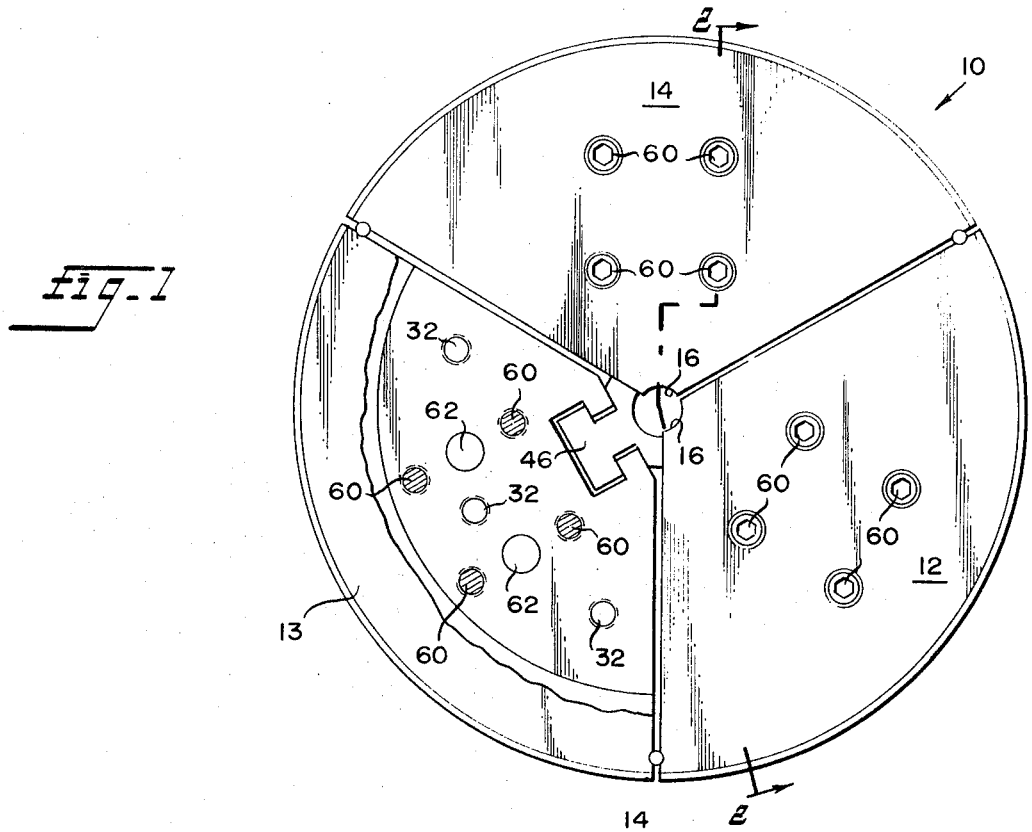
FIG. 1 is a front plan view of the chuck of this invention with parts cut away for purposes of clarity.
Figure 12:
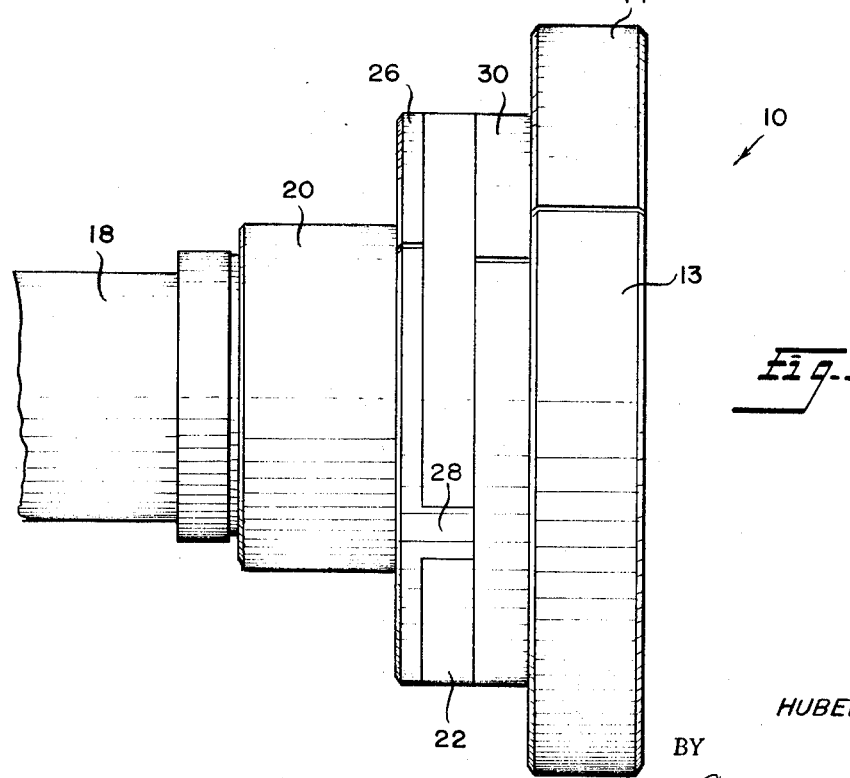
FIG. 12 is a fragmentary side elevation of the chuck of this invention.

Referring now to FIG. 1, a chuck generally designated 10 is shown, and includes chuck jaws 12 13 and 14. Jaws 12 13 and 14 have work gripping surfaces 16. Jaws 12, 13 and 14 are of the pie type, however, straight jaws or other types which may be required could also be utilized in conjunction with chuck 10.

Figure 2:
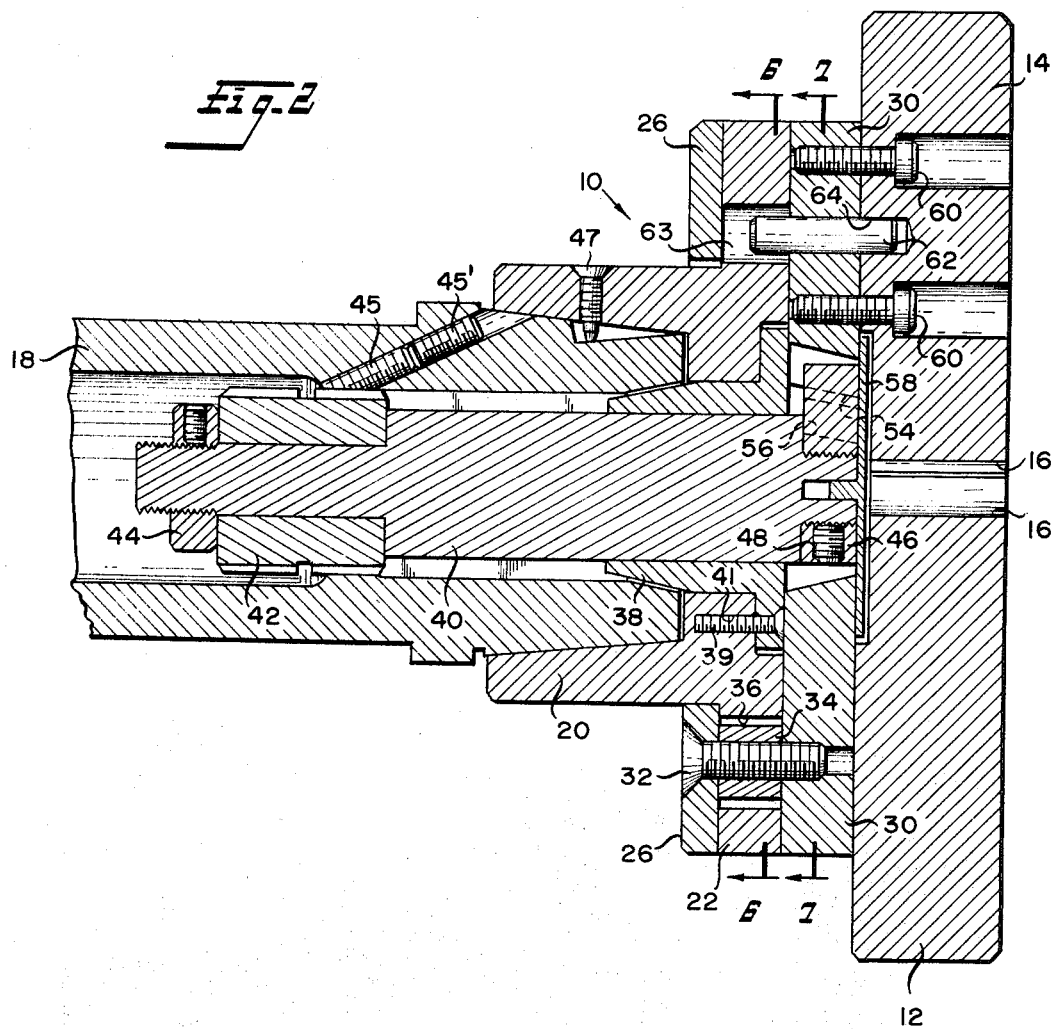
FIG. 2 is a view along lines 2—2 of FIG. 1 and viewed in the direction of the arrows.

Referring to FIG. 2, the chuck 10 is shown attached to a spindle 18 of a machine tool.

Figure 6:
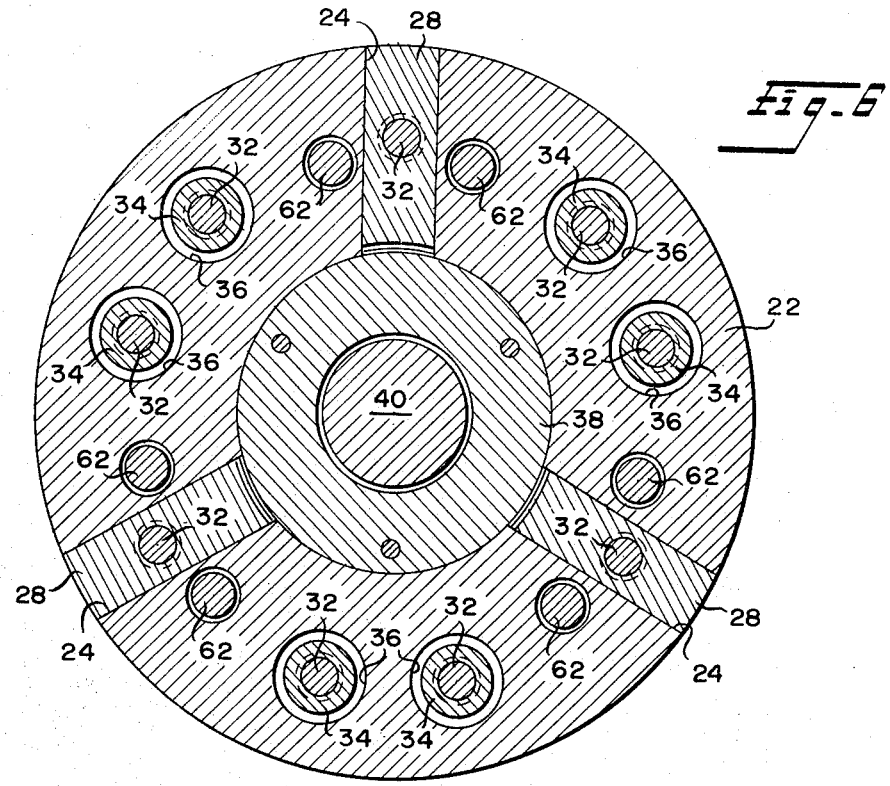
FIG. 6 is a sectional view along lines 6—6 of FIG. 2 and viewed in the direction of the arrows.
Figure 7:
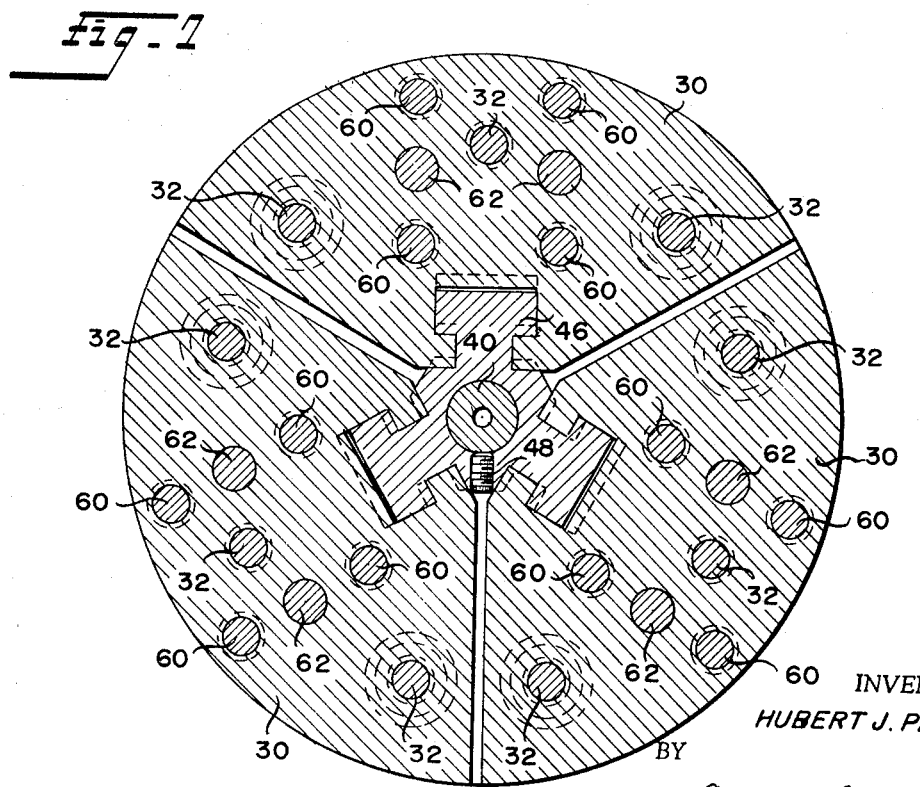
FIG. 7 is a section along lines 7—7 of FIG. 2 and viewed in the direction of the arrows.
Figure 8:
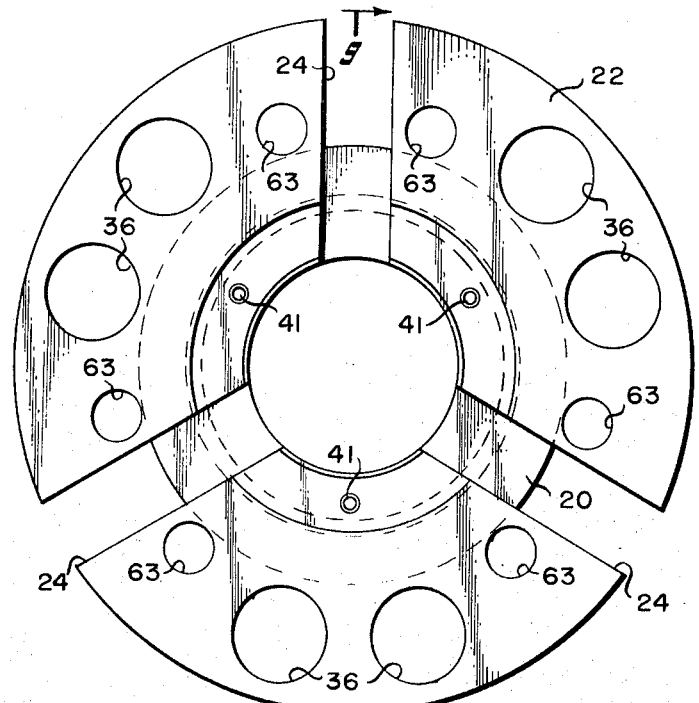
FIG. 8 is a front elevation view of the guide plate of this invention.
Figure 9:
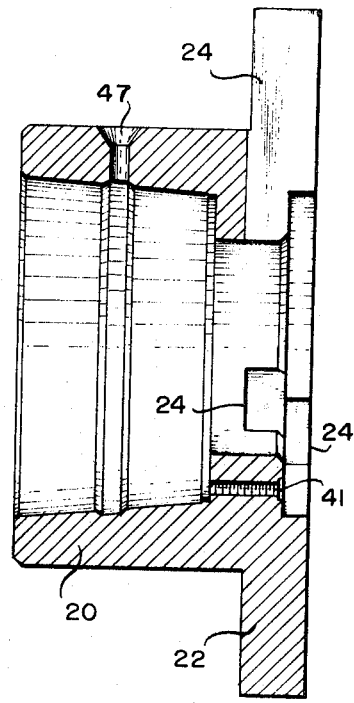
FIG. 9 is a section along lines 9—9 of FIG. 8 and viewed in the direction of the arrows.
Figure 10:
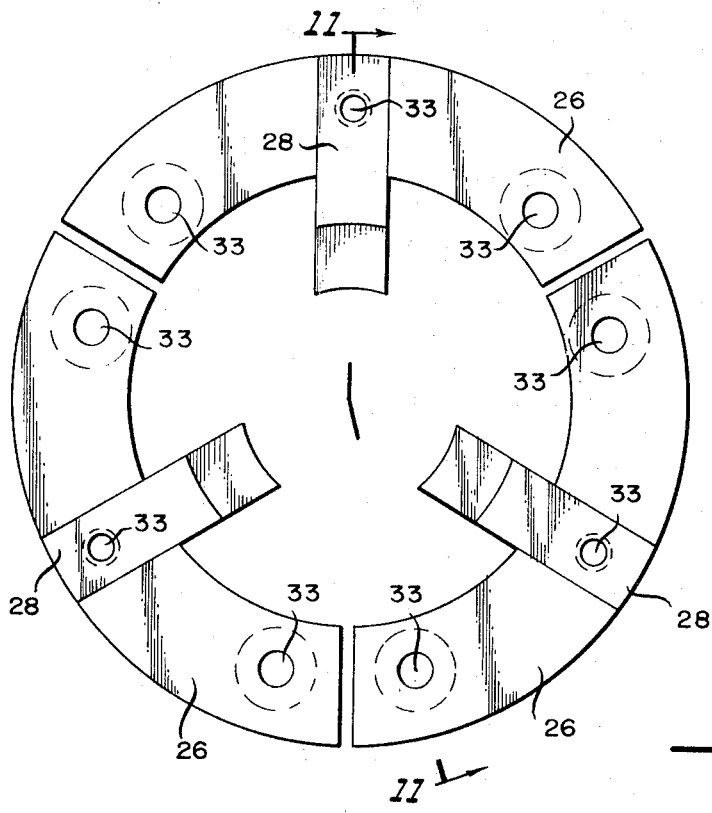
FIG. 10 is a front elevation of the key plates of this invention.
Figure 11:
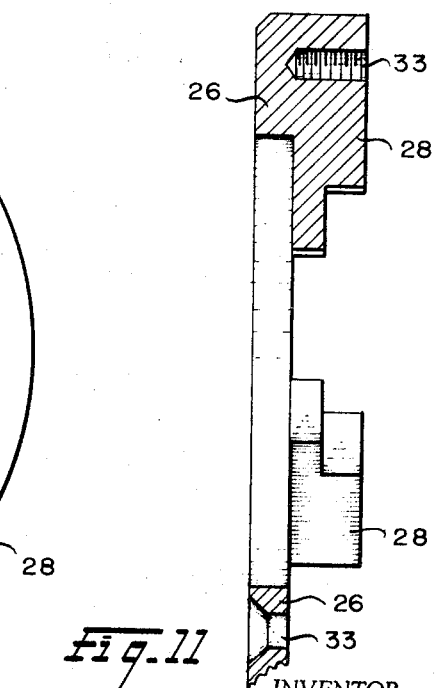
FIG. 11 is a view along lines 11—11 of FIG. 10 and viewed in the direction of the arrows.

The body of chuck 10 includes a guide plate having a generally cylindrical hub portion 20, and a radially extending flange portion 22. As best seen in FIG. 6, the flange portion 22 has a plurality of radially extending slots 24 for purposes as will be hereinafter set out.

Referring again to FIG. 2, positioned to the left of flange portion 22 as seen in the drawings, are key plates 26. Key plates 26 include projections 28 which fit into slots 24, there being one projection 28 on each key plate 26. The projections 28 fit in slots 24 so as to be reciprocable therein with close tolerances.

Positioned to the right of the flange portion 22 as seen in FIG. 2, are a plurality of master jaws 30. The master jaws 30 are secured to key plates 26 by means of bolts 32 passing through holes 33 in key plates 26. There are three bolts 32 for each of the master jaws, and two of these bolts pass through spacers 24, the third passing into each of the projections 28. Spacers 34 are positioned in holes 36 in flange portion 22, and the outer diameter of spacers 34 is substantially smaller than the diameter of holes 36. This provides for a degree of movement of the spacers 34 in the holes 36, and also serves to limit this movement.

Within the hub portion 20 of the guide plate, is a bushing 38 through which passes a draw plug 40. Bushing 38 is secured by screws 39 through holes 41 to hub portion 20. At the left end of the draw plug 40 is a collar 42 secured to draw plug 40 by means of a nut 44. Nut 40 is adjustable so as to remove any axial looseness between collar and draw plug, but allowing rotation of the draw plug when the chuck is mounted on the spindle even though collar is keyed to the spindle. Key screw 45 keys collar 42 relative to spindle 18, and is locked by set screw 45' while screw 47 locks chuck 10 to spindle 18 in a well known manner.

Figure 3:
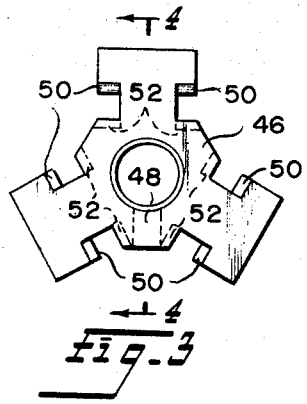
FIG. 3 is a front elevation view of the cam actuator of this invention.
Figure 4:
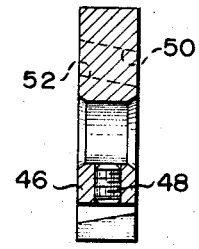
FIG. 4 is a view along lines 4—4 of FIG. 3, and viewed in the direction of the arrows.
Figure 5:
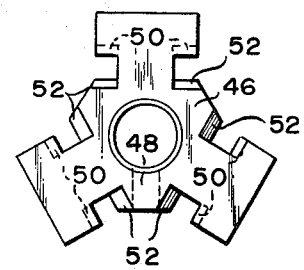
FIG. 5 is a rear elevation view of the cam actuator shown in FIG. 3.

At the outer end of the draw plug 40, a cam actuator 46 is threadedly positioned, and secured as by set screw 48. The cam actuator is more clearly seen in FIGS. 3, 4 and 5, and includes cam surfaces 50 and 52. Cam surfaces 50 and 52 engage complementary surfaces 54 and 56 formed on the master jaws 30. The arrangement is such that axial reciprocation of the cam actuator 46 results in radial reciprocation of the master jaws 30, the spacers 34 and key plates 26. This cam actuator can be threaded on the draw plug in the manner shown or it and the master jaw 30 can be reverse mounted so that reverse operation of the jaw takes place with a given movement of the draw plug. This allows the chuck to be used for internal or external holding of the workpieces with the same chuck closing mechanism.

Secured at the right end of the cam actuator 46 as seen in FIG. 2, is an annular cover member 58 extending over the cam actuator 46. Cover 58 serves to prevent any foreign particles from entering the cam surfaces 50, 52, 54 and 56 and causing any damage to the surfaces.

The work gripping jaws 12, 13 and 14 are secured to master jaws 30 by means of bolts 60. Dowels 62 extend from clearance holes 63 in flange portion 22 through master jaws 30 into holes 64 in the gripping jaws 12, 13 and 14. Thus, radial movement of master jaws 30 results in corresponding movement of the work gripping jaws 13, 12 and 14. These master jaws are bored or turned in place on the chuck to accommodate any particular workpiece.

In this manner, the area in which wear can occur in the chuck of this invention comprises the contact area between the master jaws 30 and the flange portion 22, as well as the contact surfaces between the key plate 26 and the flange portion 22. This wear area is far greater than the wear area of prior art chucks. When after a period of time, the wear becomes such that the movement of the jaws 12, 13 and 14 is loose, all that would be necessary to again obtain a tight fit would be to replace the spacers 34. A tight fit may be obtained by removing the spacers and grinding all simultaneously for all three jaws to the desired length, thus eliminating the individual hand fitting of the prior art constructions. The only parts which need to be replaced would be the spacers 34 and not the master jaws 30 or the work gripping jaws 12, 13 and 14 which heretofore had to be replaced.

While this invention has been described, it will be understood that it is capable of further modification, and this application is intended to cover any variations, used and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

I claim:
1. A master jaw chuck for machine tools including:
   a. guide plate means attachable to a machine tool spindle,
   b. key plate means positioned rearwardly of said guide plate means,
   c. master jaw means positioned forwardly of said guide plate means,
   d. spacer means between said key plate means and said master jaw means for spacing said key plate means from said master jaw means,
   e. fastener means passing through said spacer means for securing said key plate means to said master jaw means, and
   f. means operating against said master jaw means for radially moving said master jaw means, said spacer means, and said key plate means.
2. A master jaw chuck for machine tools as in claim 1 and wherein:
   a. said guide plate means includes a hub portion, and
   b. a flange portion extending radially from said hub portion.
3. A master jaw chuck for machine tools as in claim 2 and including:
   a. a plurality of radially extending slots formed in said flange portion,
   b. said key plate means including projections extending into said slots.
4. A master jaw chuck for machine tools as in claim 3 and including:
   a. a plurality of holes formed in said flange portion, said holes having a diameter grater than the width of said spacer means, and
   b. said spacer means being positioned within said holes.
5. A master jaw chuck for machine tools as in claim 3 and wherein:
   a. said key plate means comprises a plurality of segments, and
   b. at least one of said projections formed on each of said segments.
6. A master jaw chuck for machine tools as in claim 1 and wherein:
   a. said operating means includes cam means.
7. A master jaw chuck for machine tools as in claim 6 and wherein:
   a. said master jaw means includes a plurality of master jaw members, each of said members having cam surfaces thereon for cooperating with said cam means.
8. A master jaw chuck for machine tools as in claim 7 and including:
   a. draw plug means for operating said cam means,
   b. a bushing for mounting said guide plate means on said draw plug means.
9. A master jaw chuck for machine tools as in claim 8 and including:
   a. work gripping jaw means secured to said master jaw means.
10. A master jaw chuck for machine tools as in claim 9 and including:
    a. cover means for said operating means.
11. A master jaw chuck for machine tools as in claim 4 and wherein:
    a. said spacer means is substantially cylindrical and has a length at least as great as the thickness of said flange portion.
12. A master jaw chuck for machine tools as in claim 11 and wherein:
    a. each of said plurality of holes is substantially circular.
13. A master jaw chuck for machine tools as in claim 2 and wherein:
    a. said key plate means includes an inner annular opening substantially equal to the diameter of said hub portion.
14. A master jaw chuck for machine tools as in claim 2 and wherein:
    a. the periphery of each of said key plate means, said flange portion, and said master jaw means have a substantially equal radius of curvature.
15. A master jaw chuck for machine tools including:
    a. master jaw means,
    b. key plate means having a portion in abutting relationship with said master jaw means,
    c. guide plate means interposed between said master jaw means and said key plate means,
    d. means passing through said guide plate means for spacing said key plate means from said master jaw means, and
    e. means operating against said master jaw means for radially moving said master jaw means, said spacer means, and said key plate means.
16. A master jaw chuck for machine tools as in claim 15 and wherein:
    a. said guide plate means includes a hub portion, and
    b. a flange portion extending radially from said hub portion.

* * * * *